(12) United States Patent
Li et al.

(10) Patent No.: US 10,488,538 B2
(45) Date of Patent: Nov. 26, 2019

(54) APPARATUS AND TECHNIQUES FOR ACOUSTIC LOGGING TOOL MODELING

(71) Applicant: Halliburton Energy Services, Inc., Houston, TX (US)

(72) Inventors: Chen Li, Katy, TX (US); Chung Chang, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 535 days.

(21) Appl. No.: 14/381,400

(22) PCT Filed: Oct. 29, 2013

(86) PCT No.: PCT/US2013/067298
§ 371 (c)(1),
(2) Date: Aug. 27, 2014

(87) PCT Pub. No.: WO2015/056339
PCT Pub. Date: May 7, 2015

(65) Prior Publication Data
US 2016/0252637 A1 Sep. 1, 2016

(51) Int. Cl.
*G01V 1/30* (2006.01)
*G01V 1/52* (2006.01)
*G01V 1/44* (2006.01)

(52) U.S. Cl.
CPC ............... *G01V 1/303* (2013.01); *G01V 1/44* (2013.01); *G01V 1/52* (2013.01)

(58) Field of Classification Search
CPC ............ G01V 1/303; G01V 1/44; G01V 1/52
See application file for complete search history.

(56) References Cited

U.S. PATENT DOCUMENTS

| 4,365,321 A | 12/1982 | Von Bose |
| 6,930,616 B2 | 8/2005 | Tang et al. |

(Continued)

FOREIGN PATENT DOCUMENTS

| EP | 2893376 A1 | 7/2015 |
| GB | 2444832 A | 11/2005 |

(Continued)

OTHER PUBLICATIONS

"European Application Serial No. 13876774.4, Extended European Search Report dated Apr. 15, 2016", 6 pgs.

(Continued)

*Primary Examiner* — Mohamed Charioui
*Assistant Examiner* — Jeremy A Delozier
(74) *Attorney, Agent, or Firm* — Gilliam IP PLLC

(57) ABSTRACT

Apparatus and techniques described herein include receiving information indicative of a first cylindrical shell representing a portion of an acoustic logging tool, receiving information indicative of a second cylindrical shell concentrically surrounding the first cylindrical shell, the second cylindrical shell representing a second portion of the acoustic logging tool, and the second cylindrical shell comprising a fluid metal model including a non-zero density, a non-zero compressional wave propagation velocity, and a shear wave propagation velocity of zero or about zero. Information is determined indicative of an acoustic dispersion comprising a slowness (or other information indicative of a propagation velocity) of a wave propagating along the acoustic logging tool using a model including the first and second cylindrical shells.

20 Claims, 11 Drawing Sheets

(56) References Cited

U.S. PATENT DOCUMENTS

| | | | |
|---|---|---|---|
| 7,463,550 | B2 | 12/2008 | Sinha et al. |
| 7,529,152 | B2 | 5/2009 | Sinha et al. |
| 7,652,950 | B2 | 1/2010 | Sinha et al. |
| 7,660,196 | B2 | 2/2010 | Saiki et al. |
| 2004/0001389 | A1* | 1/2004 | Tang ............... G01V 1/50 367/31 |
| 2006/0256656 | A1 | 11/2006 | Sinha et al. |
| 2006/0285437 | A1 | 12/2006 | Sinha et al. |
| 2009/0005995 | A1 | 1/2009 | Tang et al. |
| 2009/0225627 | A1* | 9/2009 | Sinha ............... G01V 1/50 367/31 |
| 2011/0286307 | A1 | 11/2011 | Wang |

FOREIGN PATENT DOCUMENTS

| | | |
|---|---|---|
| GB | 2412440 B | 5/2006 |
| WO | WO-2015/065339 A1 | 5/2015 |

OTHER PUBLICATIONS

"European Application Serial No. 13876774.4, Office Action dated May 18, 2015", 3 pgs.

"European Application Serial No. 13876774.4, Reply filed Oct. 12, 2015 to Office Action dated May 18, 2015", 12 pgs.

"International Application Serial No. PCT/US2013/067298, International Preliminary Report on Patentability dated May 12, 2016", 7 pgs.

Hsu, Chaur-Jian, et al., "Mandrel effects on the dipole flexural mode in a borehole", The *Journal of the Acoustical Society of America*, 104(4), (1998), 2025-2039.

Wang, Xeaoming, "Determining formatian shear-wave transverse isotropy from borehole Stoneley-eywave measurements", *Geoghysics*, 68(1), (2003), 118-126.

Yuan-Da, Su, et al., "An equivalent-tool theory for acoustic logging and applications", *Applied Geophysics*, 8(1), (2011), 69-78.

"International Application Serial No. PCT/US2013/067298, International Search Report dated Jul. 17, 2014", 3 pgs.

"International Application U.S. Appl. No. PCT/US2013/067298, Written Opinion dated Jul. 17, 2014", 5 pgs.

Abramson, H, "Flexural Waves in Elastic Beams of Circular Cross Section", J. Acoust. Soc. Am., 29(1), (1957), 42-46.

Gazis, D. C, "Three-Dimensional Investigation of the Propagation of Waves in Hollow Circular Cylinders. I. Analytical Foundation", J. Acoust. Soc. Am., 31(5), (1959), 568-573.

Haldorsen, Jakob B.U., et al., "Borehole Acoustic Waves", Oilfield Review, Spring 2006, [Online]. Retrieved from the Internet <http://www.slb.com/~/media/Files/resources/oilfield_review/ors06/spr06/03_borehole_acoustic_waves.pdf>, (Accessed Jun. 24, 2013), 34-43.

Scheibner, David, et al., "Slow Formation Shear From an Lwd Tool: Quadrupole Inversion With a Gulf of Mexico Example", SPWLA 51st Annual Logging Symposium, (2010), 1-14.

Tang, Xioming, et al., "Estimating Formation Shear Velocity From Dispersive Logging Waveforms Using a Model-guided Processing Technique", 1992 SEG Annual Meeting, Oct. 25-29, 1992, New Orleans, Louisiana, (1992).

Thurston, R. N, "Elastic waves in rods and clad rods", J. Acoust. Soc. Am., 64(1), (1978), 1-37.

Winbow, G. A, et al., "Calculated Effects of Logging Tools on Sonic Waveforms", 1983 SEG Annual Meeting, Sep. 11-15, 1983, Las Vegas, Nevada, (1983), 7-10.

"European Application Serial No. 13876774.4, Response filed Oct. 19, 2016 to Extended European Search Report dated Apr. 15, 2016", 21 pgs.

ID Application Serial No. P-00201601749; First Office Action; dated Jul. 16, 2019, 3 pages.

MX Application U.S. Serial No. MX/a/2016/002917; Third Office Action; dated Jun. 3, 2019, 10 pages.

\* cited by examiner

APPARATUS AND TECHNIQUES FOR ACOUSTIC LOGGING TOOL MODELING

CLAIM OF PRIORITY

This application is a U.S. National Stage Filing under 35 U.S.C. § 371 of International Application PCT/US2013/067298, filed on Oct. 29, 2013, which application is hereby incorporated by reference herein in its entirety.

BACKGROUND

Various techniques may be used to evaluate geological formations. For example, measurements may be made using tools located within a borehole such as in support of geophysical and petrophysical exploration or resource extraction. In one approach, an acoustic or "sonic" logging technique is used. An acoustically transmitting transducer is located in the borehole and is electrically driven to insonify a region nearby the transducer. Insonification induces propagating acoustic waves in the borehole, within the geologic formation through which the borehole extends, or along the interface between the geologic formation and the borehole. An acoustic receiving section then detects reflected or refracted acoustic energy, such as using receive transducers at locations spaced apart from the acoustic transmitter.

In one approach, a monopole acoustic transducer is used for transmitting or receiving. In a transmission application, the monopole acoustic transducer generally emits an acoustic wavefront having spherical or cylindrical uniformity. Such a symmetric wavefront induces a compressive wavefront or "P-wave." A portion of the P-wave is reflected by the interface between the borehole and the formation at the borehole wall, and a portion of the P-wave is refracted within the formation. As the propagation direction of the refracted portion of the P-wave converges on the borehole-formation interface, a portion of the refracted P-wave energy is transferred back into the borehole (e.g., a first "head wave"). Reflected or refracted waves are then detected at respective locations remotely with respect to the transmitting transducer, such as a few meters or tens of meters away, providing information about the propagation characteristics of the formation (and thus information indicative of formation composition or porosity). A time difference between arrivals of the P-waves at respective transducers is divided by a distance between the transducers to obtain a "slowness" parameter, having units that represent an inverse of velocity (e.g., microseconds per foot or microseconds per meter).

A transverse or shear wavefront, referred to as an "S-wave," may also be induced in the formation by a monopole transducer, if the formation supports a shear wave speed faster than the velocity of a wave traveling exclusively in the fluid surrounding the borehole (e.g., a "mud wave"). When this condition is met, the formation is referred to as a "fast formation." The S-wave is similarly refracted toward the borehole-formation interface, and is detected at the respective remote locations typically following the refracted P-wave. In this manner, "shear slowness" is then determined using the time difference between arrivals of a shear wave signature at respective receiving transducers, divided by the distance between the transducers.

Other acoustic propagation modes are also supported, such as a surface wave at the borehole-formation interface, referred to as a "Stoneley wave." The arrival of the Stoneley wave at the receiving transducers generally occurs after the refracted P-wave and S-wave arrivals, and the Stoneley wave exhibits a varying degree of penetration into the formation and a slightly varying propagation velocity depending on the frequency of acoustic energy. Information about such frequency dependence or "dispersion" is used to provide information about formation permeability.

In some approaches, a dipole acoustic transducer structure may be used to provide acoustic energy to excite the formation or to receive acoustic energy coupled from the formation to the transducer structure through the borehole. A dipole acoustic transducer provides the ability to excite shear waves in formations where a shear wave propagation velocity is lower than a borehole propagation velocity, a configuration referred to as a "slow" formation. Unlike a monopole transducer, a dipole transducer can excite a dispersive flexural mode in a "slow" formation which propagates at a velocity corresponding to a shear wave velocity in the low frequency range.

A presence of the acoustic logging tool in the borehole environment alters the acoustic propagation environment within the borehole. Acoustic waves propagating within or along the acoustic logging tool body encounter an acoustic frequency-dependent or dispersive effect. Failure to account for the dispersion contribution of the acoustic logging tool on the borehole propagation environment may compromise the accuracy of other operations involving determination of geologic formation properties, particularly for measurements involving flexural waves such as shear waves.

DETAILED DESCRIPTION

Figure 1:
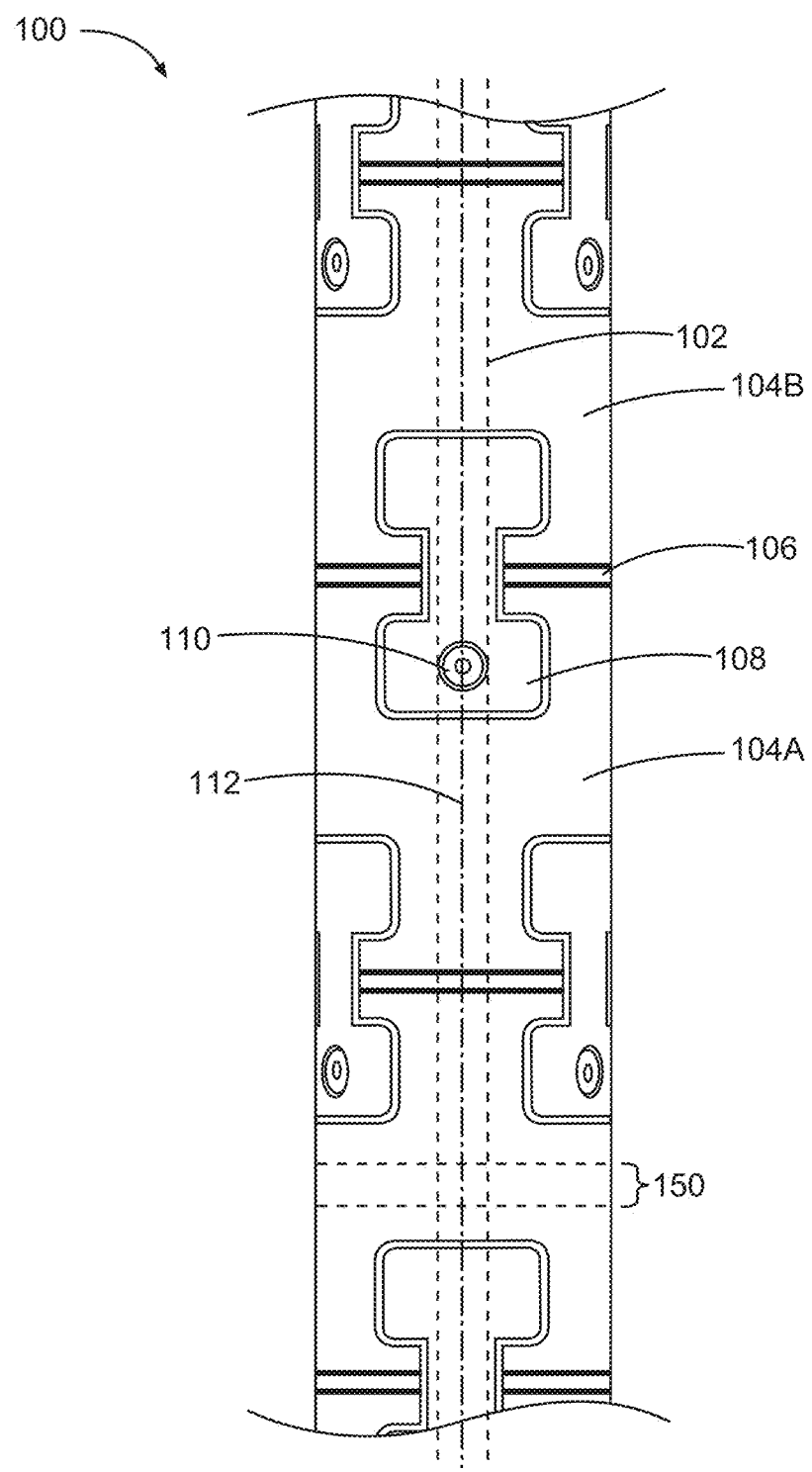
FIG. 1 illustrates generally an example of a portion of an acoustic logging tool including acoustic isolation features, such as showing a location at or near an acoustic receiving transducer located along the acoustic logging tool.

According to many examples, an effect of an acoustic logging tool on an acoustic propagation environment within a borehole is simulated. In particular, an acoustic dispersion may be determined including information about an acoustic propagation velocity (e.g., a velocity or its inverse, such as "slowness") with respect to frequency, including a contribution of an acoustic logging tool structure located in the borehole. In some examples, an inversion may be computed of the geologic formation through which the borehole extends, and such an inversion can have improved accuracy when information indicative of a tool dispersion contribution is provided to the inversion routine, as compared to results obtained assuming an "open hole" environment lacking the tool structure. In some examples, information indicative of a dispersion contribution from an acoustic logging tool can be used to establish a modified acoustic excitation waveform or to otherwise analyze a tool dispersion contribution to a borehole environment.

The present inventors have recognized, among other things, that a simulation of at least a portion of an acoustic logging tool may be simplified geometrically and thus computationally, by representing the acoustic logging tool structure using concentric cylindrical shells in a coaxial configuration. Such cylindrical shells may be homogeneous. Apparatus and techniques described in various examples herein include establishing first cylindrical shell representing a portion of an acoustic logging tool, representing an interior tubular portion of the acoustic logging tool. The first cylindrical shell is generally filled with a fluid column, representing an oil column within the acoustic logging tool.

According to various examples, a second cylindrical shell concentrically surrounds the first cylindrical shell. For example, the second cylindrical shell generally represents a mass block and coupler configuration concentrically surrounding the interior tubular portion and oil column within the acoustic logging tool. The second cylindrical shell comprises a fluid metal model representation including a non-zero density, a non-zero compressional wave propagation velocity, and a shear wave propagation velocity of zero or about zero. Establishing the first and second cylindrical shells may include one or more of extracting geometric characteristics of the first or second cylindrical shells from a more complex tool model (e.g., a computer-aided design model), receiving such information from a user, or automatically establishing such information based on an identified acoustic logging tool identifier such as a model number, according to various examples.

Information indicative of an acoustic dispersion may include a slowness (or other information indicative of a propagation velocity) of a wave propagating along the acoustic logging tool. According to various examples, such slowness information is determined with respect to acoustic frequency using an acoustic logging tool model including the first and second cylindrical shells. The information indicative of the acoustic dispersion (or other information indicative of propagation velocity) obtained from the modeling may be stored, and may be provided for use in other tasks such as for use as an input to a geologic formation inversion routine, or for other purposes such as for use in determining an acoustic excitation waveform for use with a dipole acoustic transmitter included as a portion of the acoustic logging tool.

FIG. 1 illustrates generally an example of a portion of an acoustic logging tool 100 including acoustic isolation features, such as showing a location at or near an acoustic receiving transducer located along the acoustic logging tool. The acoustic or "sonic" logging tool is 100 generally located in a borehole extending through a geologic formation. According to various examples, the acoustic logging tool 100 includes an acoustic transmitter such as including one or more monopole or dipole acoustic transducers. In particular, a dipole acoustic transducer is useful for exciting flexural modes in the borehole in cases where a shear wave propagation velocity is lower than a borehole propagation velocity. The acoustic logging tool 100 also includes a receiving section.

The receiving section includes one or more acoustic receivers, such as including an array of acoustic receiving transducers located at various positions along a longitudinal axis 112 of the acoustic logging tool and spaced apart from the acoustic transmitter. Reflected or refracted acoustic waves are detected by the acoustic receivers, and such detected information can be used to determine, among other parameters, information indicative of a propagation velocity of an acoustic wave with respect to acoustic frequency. For example, an acoustic logging tool having a dipole transmitter can include a receiving section configured to detect flexural mode acoustic waves. Such detected waves can be processed to estimate an acoustic dispersion representing a flexural wave propagation velocity with respect to acoustic frequency. Such a propagation velocity can be expressed as "slowness" (e.g., representing an inverse of velocity expressed in microseconds per foot or microseconds per meter).

However, acoustic dispersion determination is influenced by the presence of the acoustic logging tool 100 in the borehole, so an acoustic dispersion contribution from the presence of the acoustic logging tool 100 is generally factored into the dispersion determination to improve accuracy. Also, according to various examples, mechanical techniques are used to reduce the influence of the acoustic logging tool 100 on the measurement of acoustic dispersion of flexural waves. For example, the portion of the acoustic logging tool 100 shown in FIG. 1 includes various features to acoustically isolate the receiver section of the acoustic logging tool 100 from other portions of the tool and to slow down or suppress propagation of transverse or flexural waves along or through the tool body.

As an illustration, FIG. 1 shows a tool configuration including features to suppress or inhibit transverse (e.g., flexural) wave propagation along the tool in a frequency range above a specified frequency. The illustrative but non-limiting example of FIG. 1 includes mass block structures, such as a first mass block 104A and a second mass block 104B. The mass blocks are separated by an elastomeric or flexible seal 106, and adjacent mass blocks may be coupled such as using an irregularly-shaped structure, such as dog-bone-shaped or dumbbell-shaped coupler 108. Generally, examples such as the illustration in FIG. 1 include a configuration where mass blocks 104A and 104B are not continuous along the longitudinal axis of the tool. The mass blocks 104A and 104B are separated by the seal 106 so that shear wave transmission between adjacent blocks is attenuated or suppressed.

The coupler 108 generally includes an elastomeric or flexible seal at an interface between the coupler 108 and the first and second mass blocks 104A and 104B. The acoustic logging tool 100 may include one or more receivers, such located in a region 150 between couplers. The coupler 108 in the example of FIG. 1 may be fastened only to a first mass block 104A using a first fastener 110 (e.g., a cap screw, bolt, or other fastener), but remains flexibly coupled to mass block 104B using shoulders provided by the irregular shape of the coupler 108 and a corresponding mating portion of the mass block 104B. Many other configurations and variations are possible.

According to various examples, the portion of the acoustic logging tool 100 shown in FIG. 1 may also include a centrally-located hollow tubular portion 102 within the interior of the acoustic logging tool 100. During logging operations (e.g., measure-while-drilling (MWD)/log-while-drilling (LWD), wireline, or tubular fed operations) such an interior tubular portion 102 provides a centrally-located fluid (e.g., an oil or other fluid medium, such as isolated from other borehole fluids). The tubular portion 102 generally includes apertures such as slots, rings, or other features to improve measurement accuracy or to reduce an influence of the acoustic logging tool 100 on acoustic measurements. In an example, the tubular portion 102 includes apertures configured to assist in reducing a shear velocity of waves propagating through the center of the tool body. In this manner, an "equivalent" elastic modulus and shear modulus of the tubular portion 102 is adjusted using the apertures, making the tubular portion 102 more mechanically flexible, for example.

The portion of the acoustic logging tool 100 shown in FIG. 1 provides a robust mechanical coupling between adjacent sections of the acoustic logging tool 100 in support of logging or drilling operations, while also providing acoustic isolation between the transmitter and receiver section, or between adjacent receivers, by suppressing or inhibiting propagation of flexural waves above a specified frequency. In an illustrative example, the acoustic isolator configuration shown in FIG. 1 is configured to suppress flexural wave propagation along or within the acoustic logging tool 100 above a frequency of about 200 Hertz (Hz) and to provide a flexural wave slowness of about 2500 milliseconds per foot.

Figure 2:
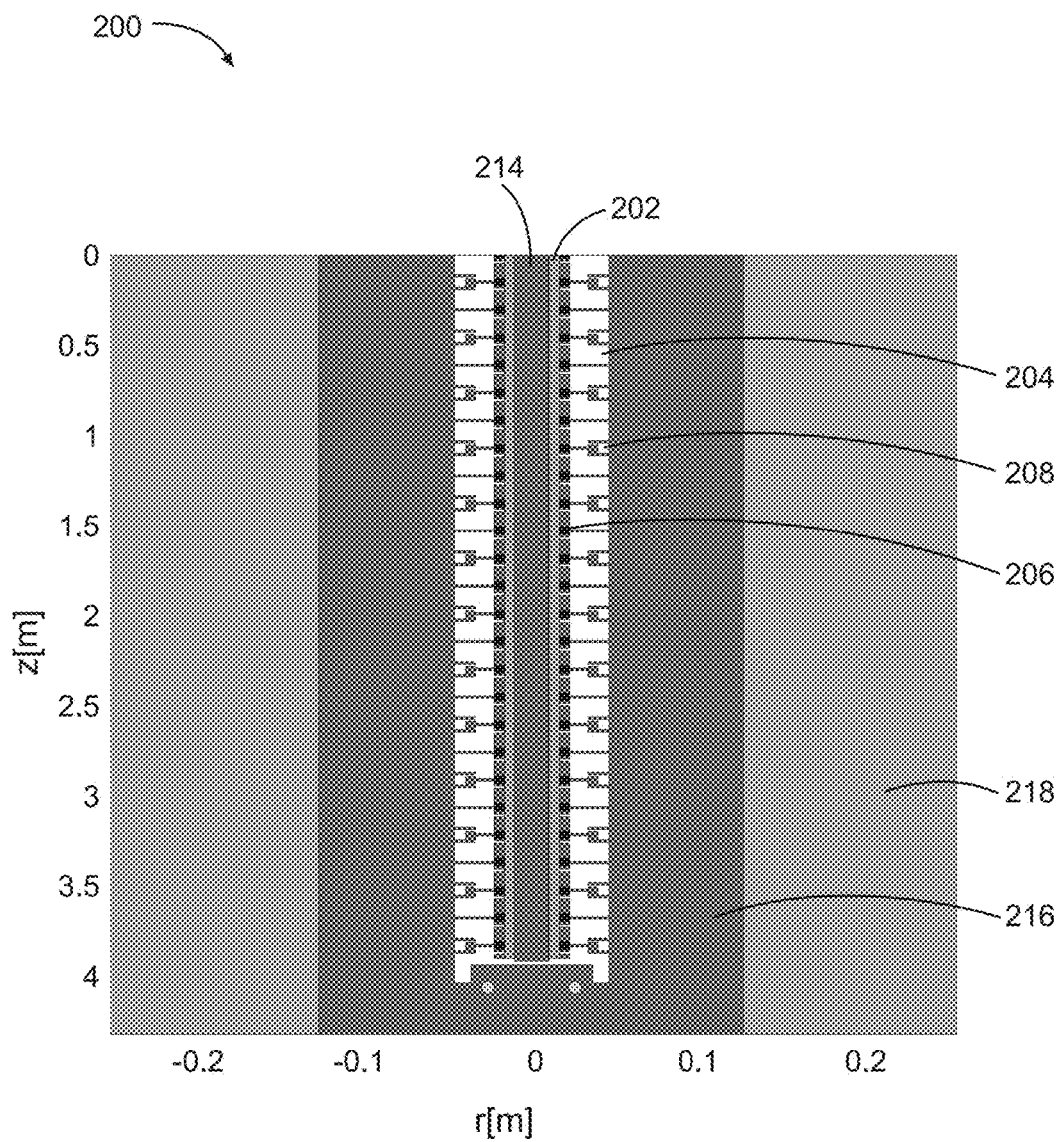
FIG. 2 illustrates generally an example of a two-dimensional view of a model of at least a portion of an acoustic logging tool.

FIG. 2 illustrates generally an example of a two-dimensional view of a model 200 of at least a portion of an acoustic logging tool, such as representative of an acoustic logging tool including the portion of the tool shown in FIG. 1. While the illustrative configuration shown in FIG. 1 provides desired acoustic isolation, the present inventors have recognized, among other things, that such a complex mechanical configuration presents various challenges with respect to mathematical simulation and extraction of information related to propagation of acoustic waves along or within the acoustic logging tool including such an acoustic isolator, along with its borehole environment. In some cases, the complexity of the actual tool configuration may entirely preclude simulation where the simulation model includes intricate tool dimensions and inhomogeneous material properties.

In one approach, a relatively complex simulation model of the acoustic logging tool can be used. For example, in FIG. 2, various regions of the acoustic logging tool are modeled using detailed features representative of corresponding features of the actual tool configuration. For example, the model 200 shown in the illustration of FIG. 2 includes regions corresponding to a mass block 204, a coupler 208, a flexible seal 206, a tubular portion 202 located within the interior of the model 200, a fluid column 214 including a fluid medium (e.g., an oil) generally isolated from the fluid of the borehole region 216 of the model 200, and a geologic formation region 218. The model 200 of FIG. 2 may be simulated using a finite difference technique, or other technique. However, the present inventors have recognized, among other things, that a model complexity of the example of FIG. 2 may preclude repeated simulation or field use of such a model due to the computational complexity of such simulations.

Accordingly, the present inventors have also recognized that, among other things, a further simplified equivalent tool model may be used to provide simulation results, such as to provide information indicative of a propagation velocity of acoustic waves through the acoustic logging tool which is represented by the simplified tool model. Information obtained from simulation of such a further simplified model may then be used for a variety of purposes, such as provided to a geologic formation inversion routine to extract properties of a geologic formation.

Figure 3:
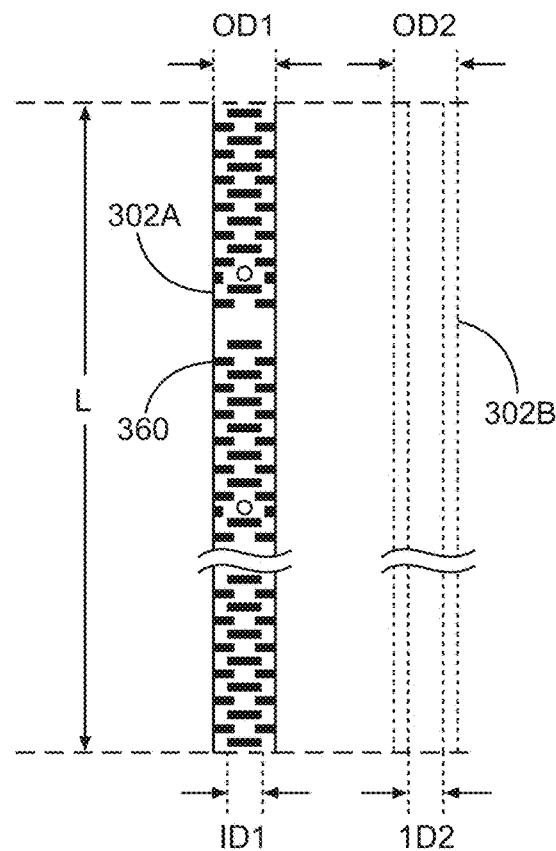
FIG. 3 illustrates generally an example of an interior tubular portion of an acoustic logging tool and a corresponding simplified model of the interior tubular portion including a cylindrical shell.

FIG. 3 illustrates generally an example of an interior tubular portion 302A of an acoustic logging tool and a corresponding simplified model of the tubular portion 302B of the interior tubular portion including a cylindrical shell. In one approach, development of simplified acoustic logging tool model is viewed as building up a coaxial structure of hollow cylinders (e.g., cylindrical shells). As discussed above in relation to the example of FIG. 1, an acoustic logging tool may include a tubular portion within the interior of the tool, such as shown illustratively as the tubular portion 302A in FIG. 3. The tubular portion 302A is modeled as a homogeneous cylindrical shell having side walls lacking apertures (e.g., an "uncut" cylindrical shell), as shown in the simplified tubular portion 302B of FIG. 3. The simplified tubular portion 302B includes a model inner diameter ID2 that matches the corresponding inner diameter ID1 of the tubular portion 302A, and similarly, a model outer diameter OD2 that matches the corresponding inner diameter OD1 of the tubular portion 302A.

To simplify simulation, the material properties of the simplified tubular portion 302B are uniform (e.g., homogeneous), and may be selected using information obtained via measurement or simulation of the tubular portion 302A. For example, the simplified tubular portion 302B may be homogeneous (e.g., having a uniform density, a uniform elastic modulus, and a uniform Poisson's ratio in all portions of the simplified tubular portion 302B region). In an example, the density of the simplified tubular portion 302B is assigned by dividing a mass of the tubular portion 302A by a volume of the simplified tubular portion 302B sidewalls lacking apertures. Other model parameters for the simplified tubular portion 302B may be determined using a variety of approaches, such as including using one or more techniques discussed below in relation to FIG. 4 or FIG. 8, for example.

Figure 4:
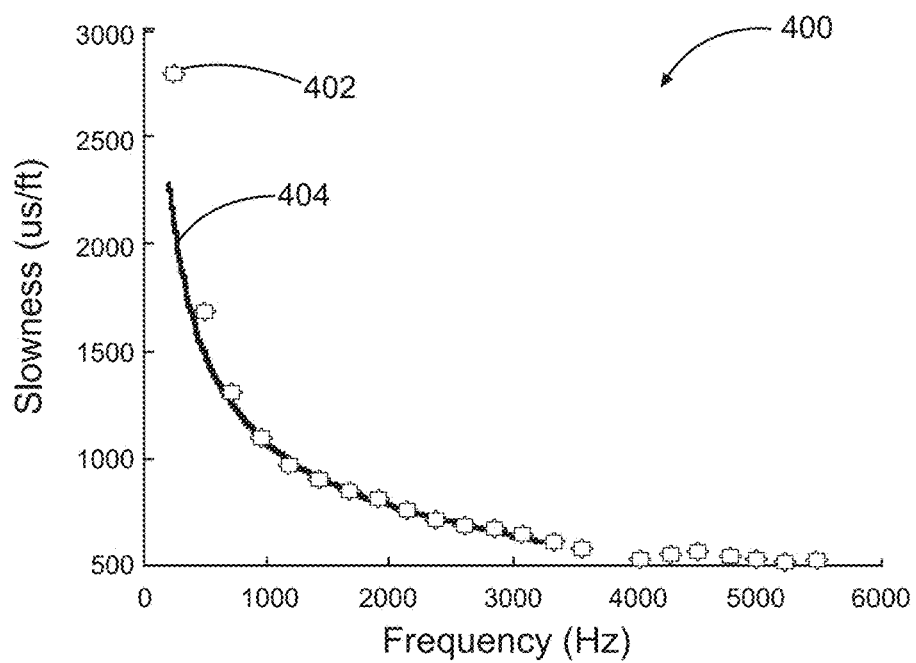
FIG. 4 illustrates generally an illustration of a comparison between a modeled acoustic dispersion with respect to frequency of an interior tubular portion of an acoustic logging tool and a plot of a curve fit to the modeled acoustic dispersion.

FIG. 4 illustrates generally an illustration 400 of a comparison between a finite-difference-modeled acoustic dispersion 402 with respect to frequency of an interior tubular portion of an acoustic logging tool and a plot 404 of a curve generated using a simplified analytical model and then fit to the modeled acoustic dispersion 402. The dispersion 402 is generally determined using a more complex geometric model including apertures in the interior tubular portion. The analytical model of the plot 404 assumes an uncut hollow cylinder inside an infinite fluid medium (e.g., water), given inputs of density, elastic modulus, and Poisson's ratio.

One or more of an elastic modulus or Poisson's ratio having a best fit with the dispersion 402 are identified using various iterations of the analytical model. The identified elastic modulus or Poisson's ratio can then be used for subsequent modeling. For example, the plot 404 represents an illustration of a simplified tubular portion model result, for an uncut tubular model lacking apertures, having a dispersion showing a good fit with the dispersion 402 obtained for the more complex geometric configuration including apertures. The identified material properties for the simplified model of the tubular portion, such as the identified elastic modulus or Poisson's ratio, may be re-used in subsequent modeling such as in a portion of the coaxial model configuration shown in FIG. 5.

A variety of numerical solution techniques can be used to aid in identifying the elastic modulus or Poisson's ratio for the analytical model 404 having the best fit with the finite-difference simulation of the dispersion 402. As an illustration, a two-dimensional root finding routine may be used to contemporaneously determine an elastic modulus and Poisson's ratio offering a desired fit between a dispersion 402 obtained via simulation corresponding to the more complex geometry shown in the tubular portion 302A of FIG. 3, versus the dispersion obtained an analytical model of the cylindrical shell of the simplified tubular portion 302B of FIG. 3 shown in the plot 404 of FIG. 4. For example, the root finding routine may be used to provide an elastic modulus and Poisson's ratio for the uncut tubular representation that reduces or minimizes a least squared error (LSE) between the analytical model and the dispersion 402. Other approaches may be used in addition to or instead of the techniques discussed above.

For example, in another approach, the finite-difference modeled dispersion 402 need not be determined Instead, or in addition to other techniques, a finite element or other mechanical model of the interior tubular portion is established. The finite element or other mechanical model includes the apertures or other realistic features and is subject to modeled deformation including bending and elongation. In response to the bending and elongation, an equivalent elastic modulus and Poisson's ratio are then determined and used as the elastic modulus and Poisson's ratio for the simplified uncut tubular model.

Figure 5:
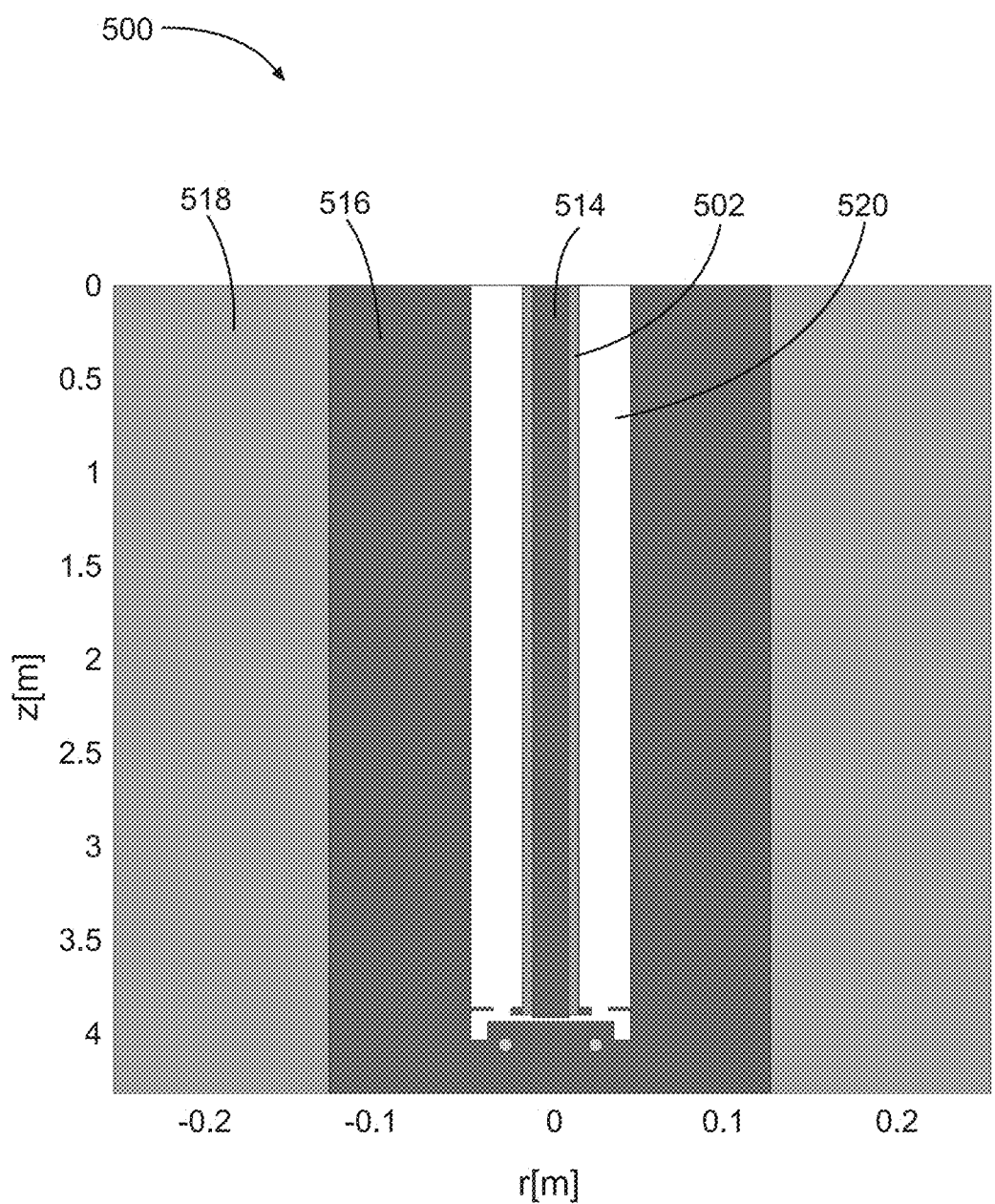
FIG. 5 illustrates generally an example of a simplified acoustic logging tool model including a layered coaxial configuration.
Figure 6A:
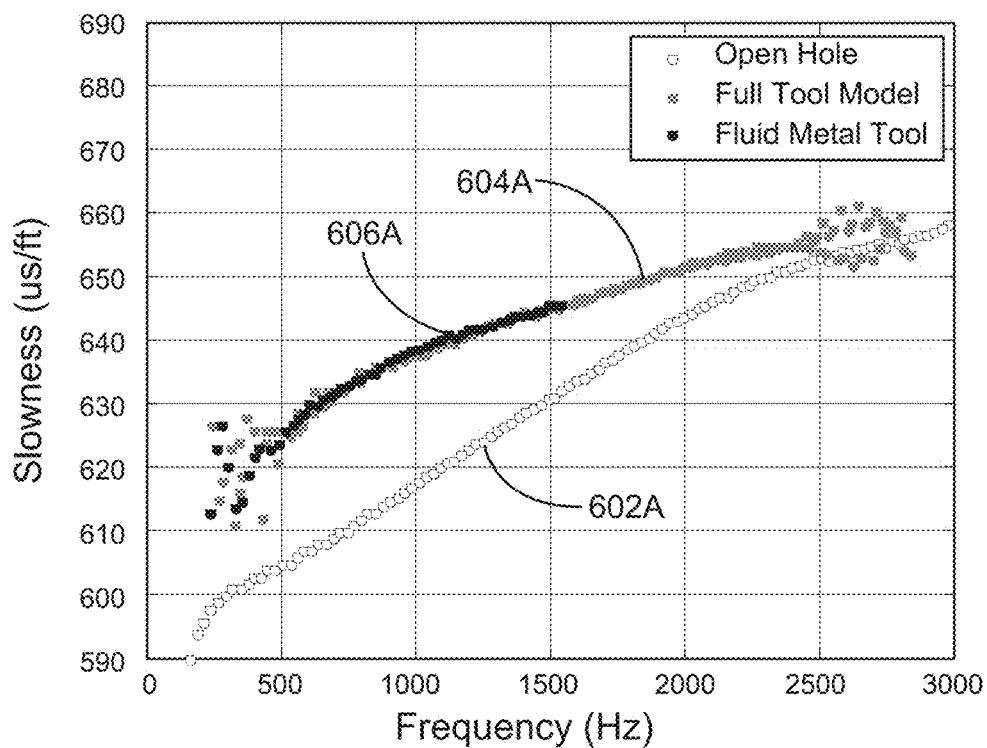
FIGS. 6A through 6C illustrate generally examples including simulated acoustic dispersion with respect to frequency corresponding to a complex acoustic logging tool configuration, a simplified acoustic logging tool model, and in the examples of FIGS. 6A and 6B, an "open hole" configuration lacking a tool, for comparison.
Figure 6B:
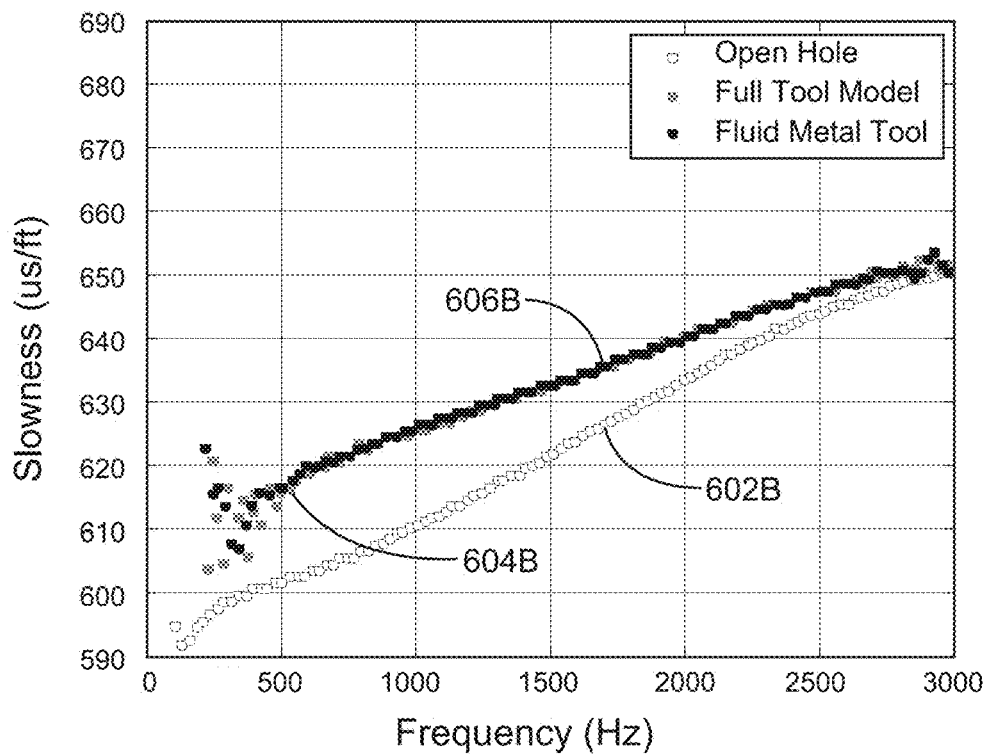
Figure 6C:
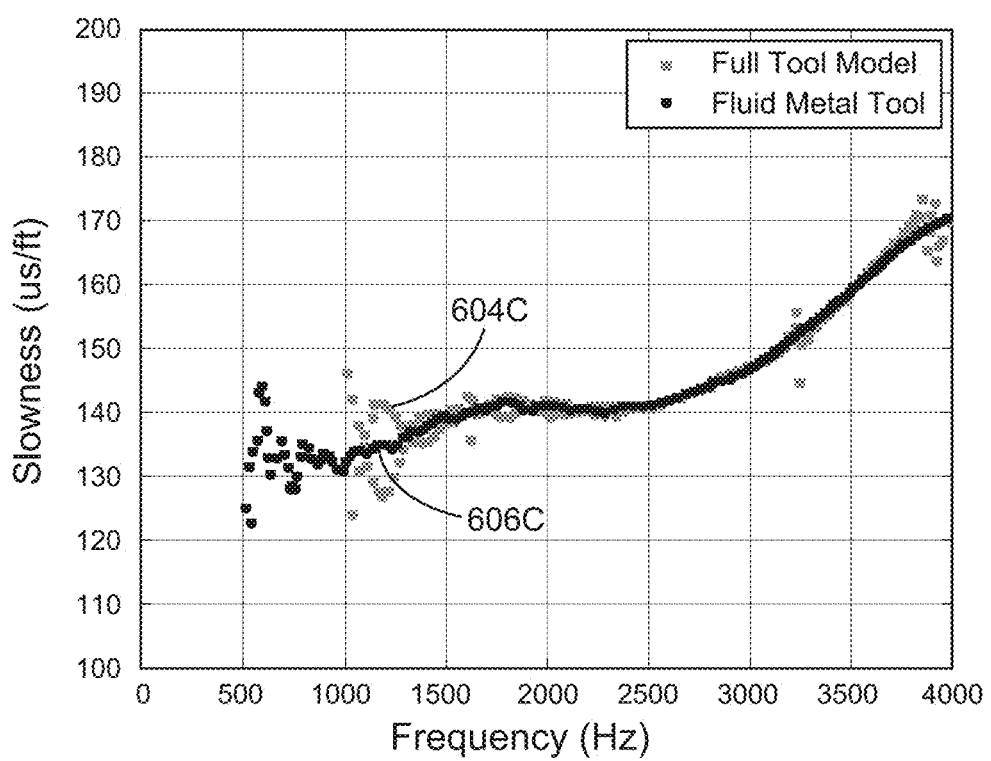

FIG. 5 illustrates generally an example of a simplified acoustic logging tool model 500 including a layered coaxial configuration. The simplified model 500 may then be used to simulate an acoustic propagation environment in a borehole including the acoustic logging tool represented by the model 500. Illustrative examples of such simulations are shown in FIGS. 6A through 6C.

As discussed with respect to the examples of above, and elsewhere herein, the present inventors have recognized, among other things, that an acoustic logging tool can be represented as multi-layered coaxial configuration of concentric shells. According to the illustration of FIG. 5 and many other examples, the shells are homogeneous, having uniform material properties and having a simple geometry. For example, from the center looking radially outward, the model 500 of FIG. 5 includes a fluid column 514 (e.g., an oil column isolated from borehole fluids). The fluid column 514 has an outer diameter matching an inner diameter of a first cylindrical shell 502. The first cylindrical shell 502 generally represents an interior tubular portion of the acoustic logging tool. The outer diameter of the first cylindrical shell 502 matches the inner diameter of a second cylindrical shell 520. The second cylindrical shell 520 generally represents a mass block and coupler structure (e.g., an acoustically-isolating portion) of the acoustic logging tool. Other portions of the model 500 may include features such as a borehole region 516, and a geologic formation region 518 through which the borehole extends.

The fluid column 514 is generally homogeneous having dimensions and acoustic properties selected to model the fluid located in the center of the interior tubular portion of the acoustic logging tool. For example, such properties may correspond to the actual fluid dimensions of the mud column and the acoustic properties of the drilling mud as determined by measurement or theory. The first cylindrical shell is also generally homogeneous, and may use the dimensions and material properties (e.g., density, elastic modulus, and Poisson's ratio) as determined according to the techniques described in relation to the example of the simplified tubular portion 302B of FIG. 3.

The second concentric shell 520 is specified to represent a complex mechanical structure including mass blocks and couplers, such as including acoustic isolation features similar to the example of FIG. 1. However, in order to reduce geometric and computational complexity, the second concentric shell 520 is configured as a uniform cylindrical shell, such as having homogeneous material properties throughout the shell region. The present inventors have recognized, among other things, that the acoustically-isolating properties of the mechanical configuration of FIG. 1 can be represented as a homogeneous "fluid metal" structure. In such a structure, shear waves are attenuated or suppressed, particular as acoustic frequency increases.

Such behavior can be modeled by assigning material properties to the second cylindrical shell 520 including a density and compressional wave propagation velocity approximating or matching a density and compressional wave propagation velocity of the mass block material including in a corresponding acoustically-isolating portion of the acoustic logging tool. But, a shear wave propagation velocity of the second cylindrical shell 520 can be assigned as zero or about zero. In this manner, the complex geometry and inhomogeneous material properties of the actual acoustic logging tool can be simplified by substituting simple cylindrical shell structures to represent various portions of the acoustic logging tool, offering similar acoustic propagation characteristics for purposes of computation of an acoustic dispersion, for example.

The present inventors have also recognized that the geometry (e.g., dimensions) of the first and second cylindrical shells 502 and 520 may be assigned to model the dimensions of the corresponding portions of the actual acoustic logging tool. For example, the inner and outer diameters of the first cylindrical shell 502 may be assigned to match or approximate the dimensions of the interior tubular portion of the acoustic logging tool. The inner and outer diameter of the second cylindrical shell 520 may be assigned to match or approximate the interior and exterior dimensions of the mass block, seal, and coupler portion of the acoustic logging tool.

Similarly, the first and second cylindrical shells 502 and 520 may be assigned constitutive (e.g., material) properties as described in examples elsewhere herein. However, the geometry and constitutive properties of the first and second cylindrical shells 502 and 520 of the acoustic logging tool model need not depend on the size, shape, or material properties of the borehole region 516, or the geologic formation region 518, unlike other approaches. For example, the geometry and properties of the first and second cylindrical shells 502 and 520 may be assigned entirely independently of other portions of the model, simplifying simulation and providing further validation of the physical accuracy of the simulation model.

FIGS. 6A through 6C illustrate generally examples including simulated acoustic dispersion with respect to frequency corresponding to a complex acoustic logging tool configuration, a simplified acoustic logging tool model, and in the examples of FIGS. 6A and 6B, an "open hole" configuration lacking a tool, for comparison. The illustrations of FIG. 6A through 6C generally provide validation that a simplified equivalent tool model (e.g., as shown in the example of FIG. 5) generally provides simulation results closely approximating results obtained from a more complex tool model (e.g., as shown in the example of FIG. 2).

In the illustrative example 600A of FIG. 6A, a simulated acoustic dispersion of a complex acoustic logging tool model 604A is shown along with a simulation of a simplified acoustic logging tool model 606A including a "fluid metal" region, and a simulation of an "open hole" configuration 602A. The geologic formation region of the example of FIG. 6A includes a compressional slowness (DTC) of 170 microseconds per foot (µs/f), a shear wave slowness (DTS) of 600 µs/f. A borehole region mud density used for the simulation was 1.95 grams per cubic centimeter (g/cc), and the borehole region diameter was 10 inches. Good agreement is shown between the dispersion characteristics of the complex model 604A and the simplified model 606A in the region from about 500 Hz to beyond about 1500 Hz.

In the illustrative example 600B of FIG. 6B, a simulated acoustic dispersion of a complex acoustic logging tool model 604B is shown along with a simulation of a simplified acoustic logging tool model 606B including a "fluid metal" region, and a simulation of an "open hole" configuration 602B. The geologic formation region of the example of FIG. 6B includes a DTC equal to 170 µs/f, a DTS equal to about 600 µs/f. A borehole region mud density used for the simulation was 1.95 g/cc, and the borehole region diameter was 8 inches. Good agreement is shown between the dispersion characteristics of the complex model 604B and the simplified model 606B in the region from about 500 Hz to beyond about 2500 Hz.

In the illustrative example 600C of FIG. 6C, a simulated acoustic dispersion of a complex acoustic logging tool model 604C is shown along with a simulation of a simplified acoustic logging tool model 60CB including a "fluid metal" region. The geologic formation region of the example of FIG. 6C includes a DTC equal to 76 µs/f, a DTS equal to about 132.5 µs/f. A borehole region mud density used for the simulation was 2.5 g/cc, and the borehole region diameter was 10 inches. Good agreement is shown between the dispersion characteristics of the complex model 604C and the simplified model 606C in the region from about 1500 Hz to beyond about 3500 Hz.

Figure 7:
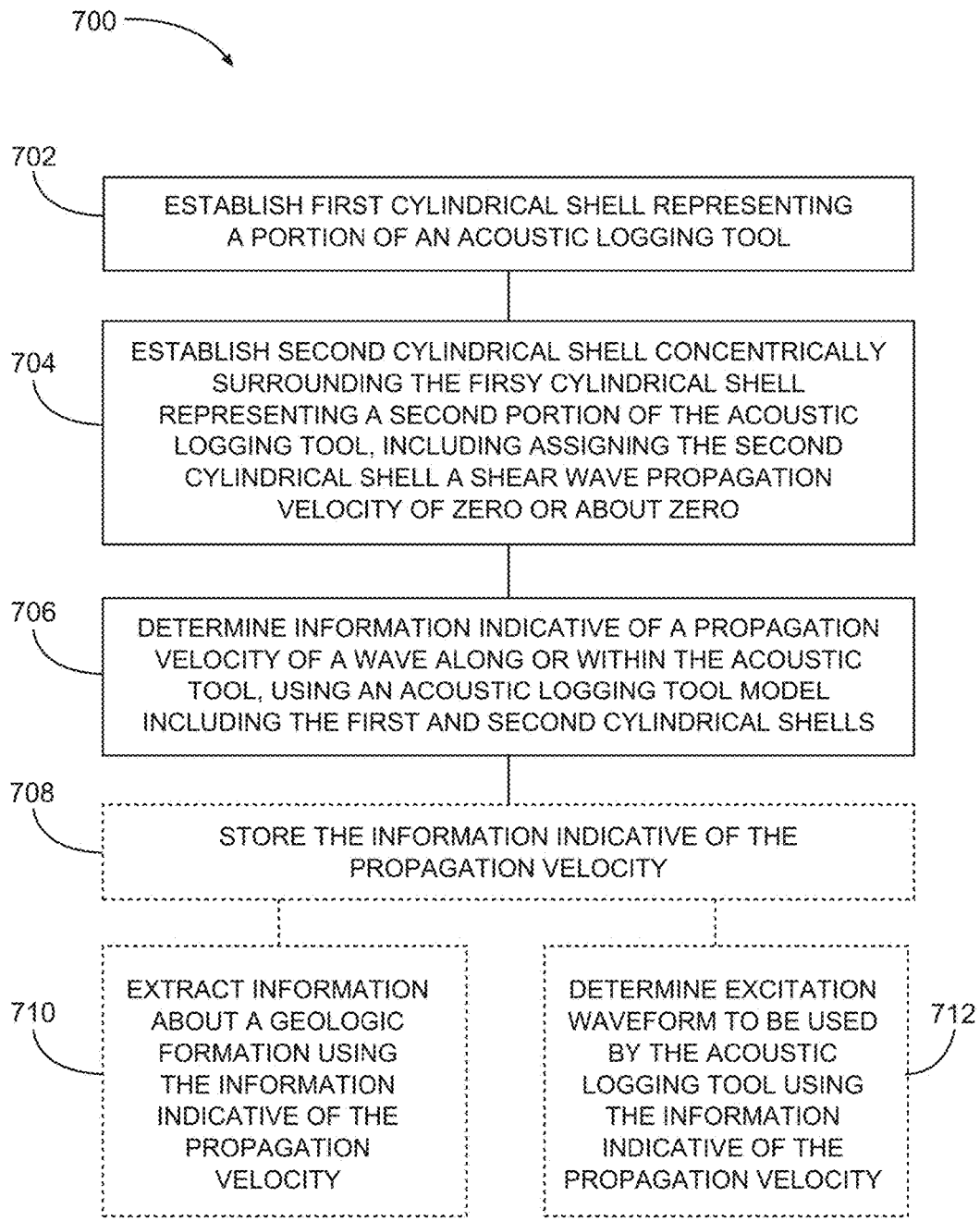
FIG. 7 illustrates generally a technique, such as a method, including establishing a model of an acoustic logging tool.

FIG. 7 illustrates generally a technique 700, such as a method, including establishing a model of an acoustic logging tool. Such modeling may be carried out before, during, or after logging operations. For example, such modeling may be used during drilling or logging operations to determine an acoustic logging tool dispersion contribution, or more generally after such operations to enhance an accuracy of other modeling such as in support of mathematical inversion to determine formation properties. At 702, a first cylindrical shell is established. The first cylindrical shell represents a portion of the acoustic logging tool, such as representing a slotted or cut center tube located in an interior portion of the acoustic logging tool. Establishing the first cylindrical shell may include receiving information indicative of the dimensions or material properties from a user. Or, such information may be obtained automatically from another system, such as automatically in response to selection or use of a particular acoustic logging tool configuration for which parameters have been previously stored.

At 704, a second cylindrical shell is established, located concentrically surrounding the first cylindrical shell. The second shell also represents a portion of the acoustic logging tool. For example, the second cylindrical shell may be assigned properties to represent an acoustically-isolating portion of the acoustic logging tool. Shear-wave or flexural wave suppression may be represented by assigning the second cylindrical shell a shear wave propagation velocity of zero or about zero. Other material properties of the second cylindrical shell are assigned to match a portion of the acoustic logging tool. For example, the density and compressional wave propagation velocity of the second cylindrical shell may be assigned to match corresponding values of such parameters for the mass block material included in an acoustically-isolating portion of the acoustic logging tool.

At 706, information indicative of a propagation velocity of an acoustic wave propagating within or along the acoustic tool is determined using a model including the first and second cylindrical shells. Other features of the model include a borehole region to represent the annulus between the acoustic tool and a geologic formation, a region modeling the geologic formation, and a region modeling a mud or other fluid column located in the center of the tool.

At 708, various examples include storing the information indicative of the propagation velocity. The information indicative of the propagation velocity need not literally be a velocity. For example, information indicative of a propagation velocity can be represented as a slowness (e.g., in units of time per unit distance), such as determined or reported with respect to acoustic frequency (e.g., an acoustic dispersion). Such information can be indicative of a dispersion corresponding to a specified mode, such as a flexural wave propagation mode.

At 710, various examples include extracting information about a geologic formation using the information indicative of the propagation velocity determined using the model. For example, acoustic dispersion information including information indicative of a dispersion contribution of the acoustic logging tool located in the borehole is provided to a geologic formation inversion routine, generally after acoustic logging has been performed. The accuracy of the inversion routine is enhanced using the dispersion information obtained by simulating the acoustic logging tool using the simplified model including the first and second concentric cylinders.

In other examples, at 712, an excitation waveform used by a transmitting acoustic transducer may be selected or modified according to acoustic propagation velocity (e.g., dispersion) information stored at 708, such as during acoustic logging operations. For example, an acoustic transmission waveform, acoustic pulse timing, or an acoustic transducer transmitter configuration may be selected or adjusted using information about dispersion information obtained via simulation and stored at 708. In this manner, acoustic transmission may be established in order to reduced or suppress undesired propagation modes coupled through the acoustic logging tool.

Figure 8:
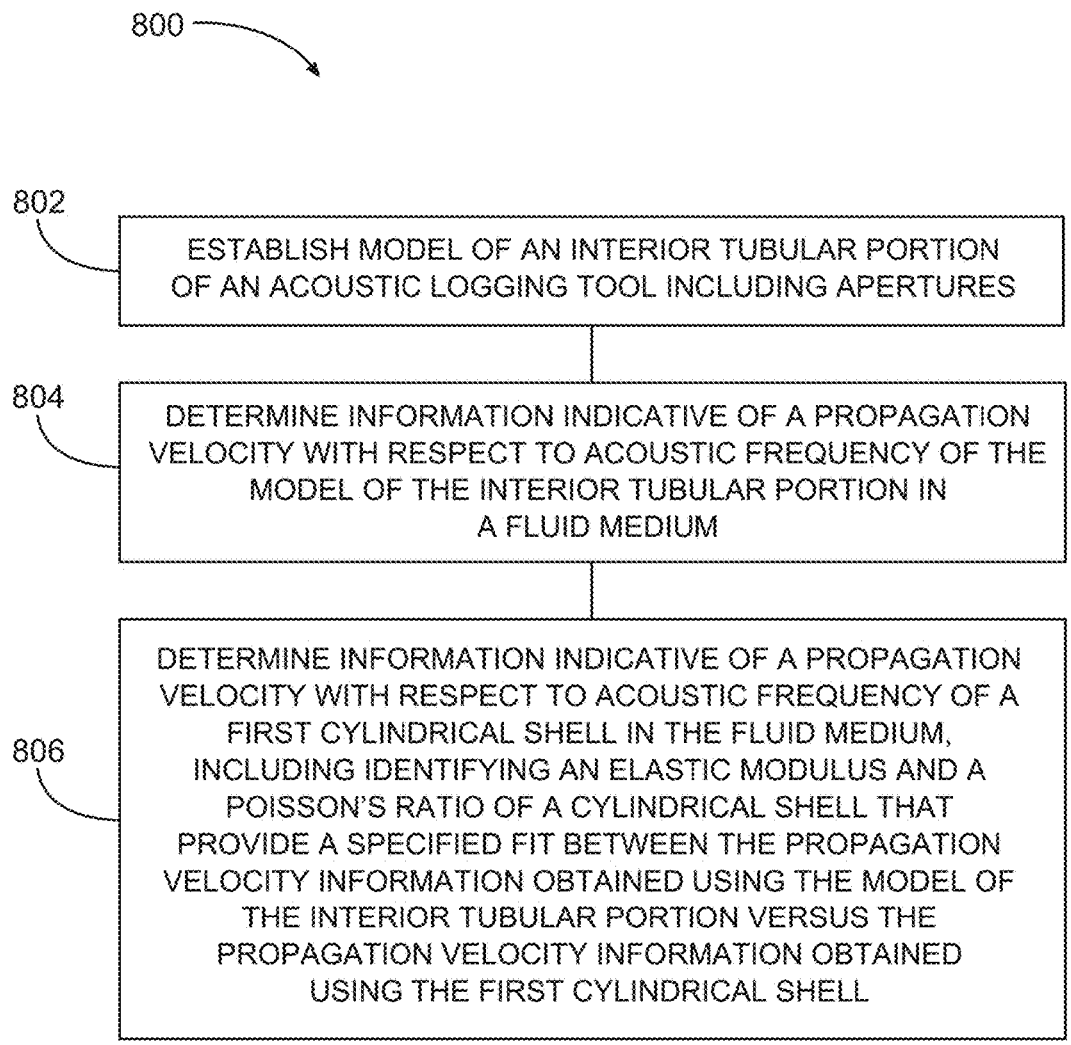
FIG. 8 illustrates generally a technique, such as a method, including determining parameters for portions of a model of an acoustic logging tool.

FIG. 8 illustrates generally a technique 800, such as a method, including determining parameters for portions of a model of an acoustic logging tool. At 802, a model of an interior tubular portion of an acoustic logging tool is established, including apertures found in the actual interior tubular portion of the acoustic logging tool. At 804, information indicative of an acoustic propagation velocity with respect to acoustic frequency (e.g., dispersion) is determined using the model established at 802, including modeling the interior tubular portion including apertures in a fluid medium (e.g., an infinite water medium). At 806, information is determined indicative of an acoustic propagation velocity with respect to acoustic frequency for a cylindrical shell (e.g., a dispersion simulated for the cylindrical shell) in a fluid medium. Generally, the first cylindrical shell lacks apertures. A Poisson's ratio and elastic modulus are identified that provide a specified fit between the propagation velocity information obtained using the model of the interior tubular portion including apertures versus the propagation velocity information obtained using the cylindrical shell lacking apertures.

Figure 9:
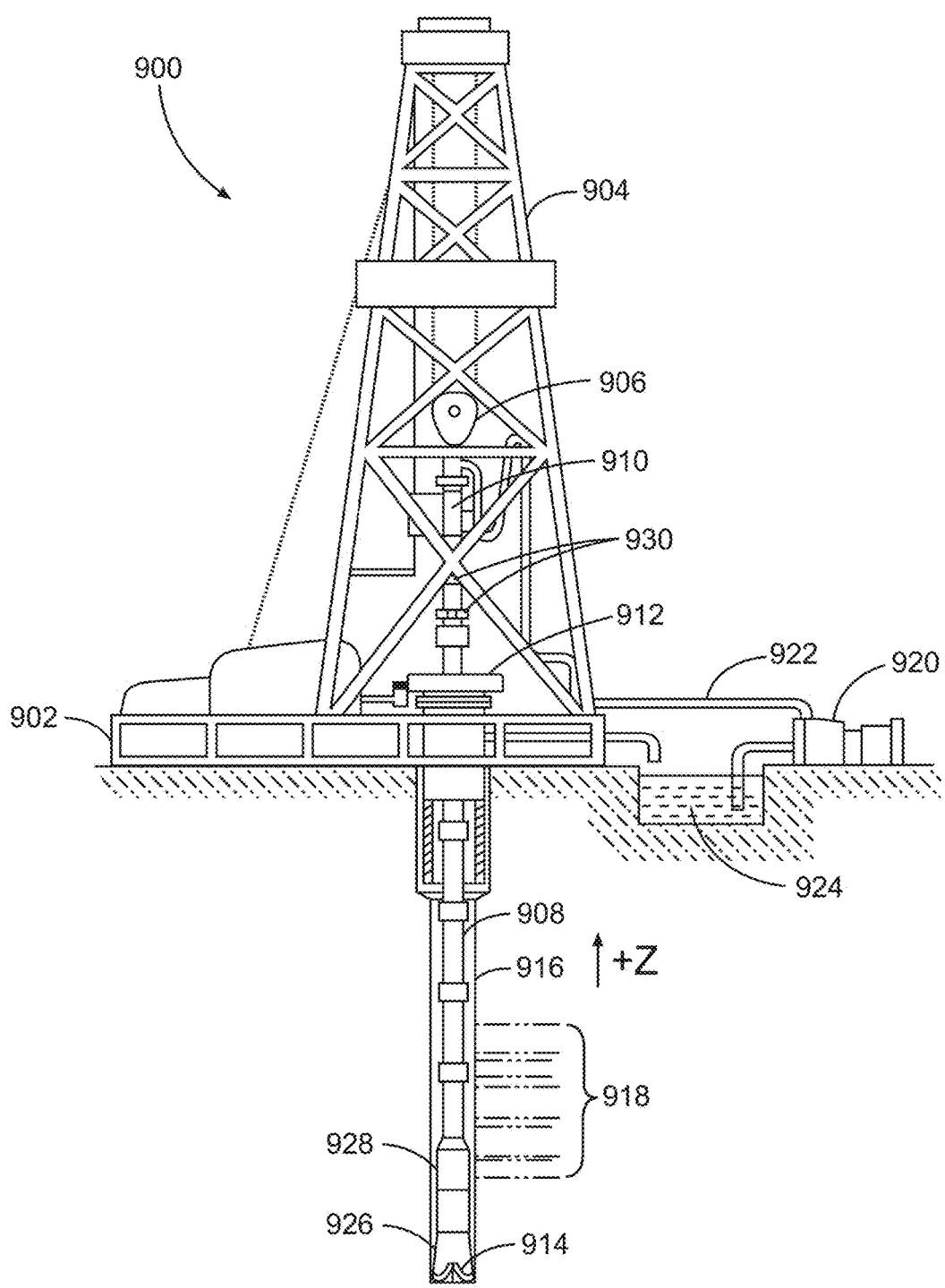
FIG. 9 illustrates generally an example of a drilling apparatus, such as including a measure-while-drilling (MWD) or log-while-drilling (LWD) capability.

FIG. 9 illustrates generally an example of a drilling apparatus, such as including a measure-while-drilling (MWD) or log-while-drilling (LWD) capability. The illustrative example of FIG. 9 may include apparatus such as shown and discussed elsewhere herein, or techniques shown and discussed elsewhere herein, and generally includes using one or more symmetric or asymmetric dipole acoustic transducers. In the example of FIG. 9, a drilling rig or platform 902 generally includes a derrick 904 or other supporting structure, such as including or coupled to a hoist 906. The hoist 906 may be used for raising or lowering equipment or other apparatus such as drill string 908. The drill string 908 may access a borehole 916, such as through a well head 912. The lower end of the drill string 908 may include various apparatus, such as a drill head 914, to create the borehole 916. A drilling fluid or "mud" may be circulated in the annular region around the drill head 914 or elsewhere, such as provided to the borehole 916 through a supply pipe 922, circulated by a pump 920, and returning to the surface to be captured in a retention pit 924 or sump. Various subs or tool assemblies may be located along the drill string 908, such as include a bottom hole assembly (BHA) 926 or a second sub 928.

As the BHA 926 or second sub 928 pass through various regions of a formation 918, information may be obtained. For example, the BHA 926, or the second sub 928, may include apparatus such as shown in the example of FIG. 1 or 10 through 11, or techniques as discussed in FIGS. 2 through 5, 6A through 6C, or 7 through 8, such as to perform acoustic (i.e., "sonic") logging or simulation using a model of an acoustic tool used for such logging.

The second sub 928 may include wireless telemetry or logging capabilities, or both, such as to transmit or later provide information indicative of acoustic energy received by a transducer to operators on the surface or for later access in evaluation of formation 918 properties. For example, portions 930 of the apparatus 900 at the surface may include one or more of wireless telemetry, processor circuitry, or memory facilities, such as to support log-while-drilling (LWD) or measurement-while-drilling (MWD) operations.

Figure 10:
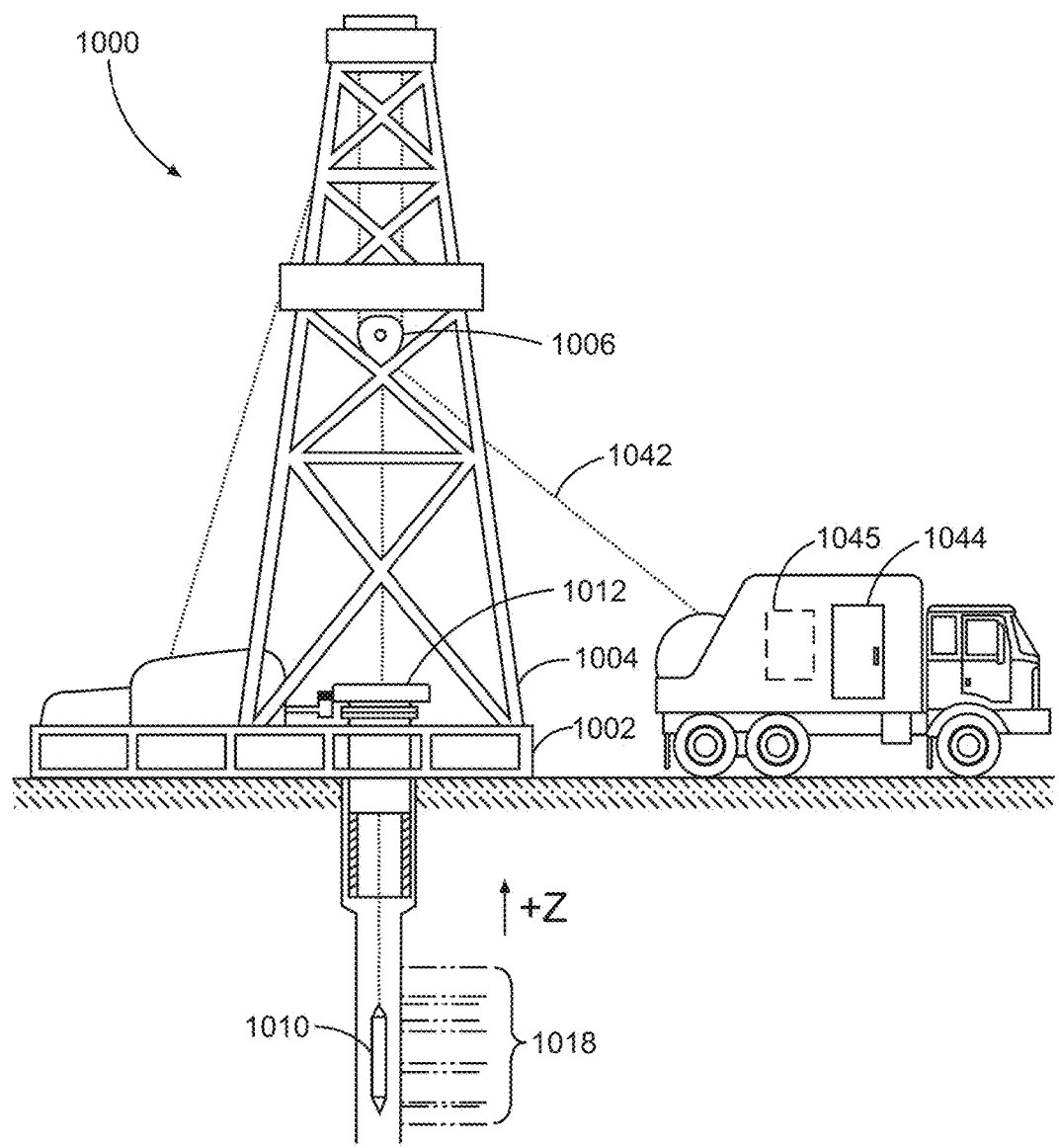
FIG. 10 illustrates generally an example of a wireline logging apparatus.

FIG. 10 illustrates generally an example of a wireline logging apparatus. The illustrative example of FIG. 10 may include apparatus such as shown and discussed elsewhere herein, or techniques shown and discussed elsewhere herein, and generally includes using one or more symmetric or asymmetric dipole acoustic transducers. Similar to the example of FIG. 9, a hoist 1006 may be included as a portion of a platform 1002, such as coupled to a derrick 1004, and used to raise or lower equipment such as a wireline sonde 1010 into or out of a borehole. In this wireline example, a cable 1042 may provide a communicative coupling between a logging facility 1044 (e.g., including a processor circuit 1045 or other storage or control circuitry) and the sonde 1010. In this manner, information about the formation 1018 may be obtained, such as obtained using via acoustic logging using the sonde 1010, as discussed in other examples herein, or using simulation results obtained from modeling such a sonde 1010 (e.g., a sonde including an acoustic logging tool).

Figure 11:
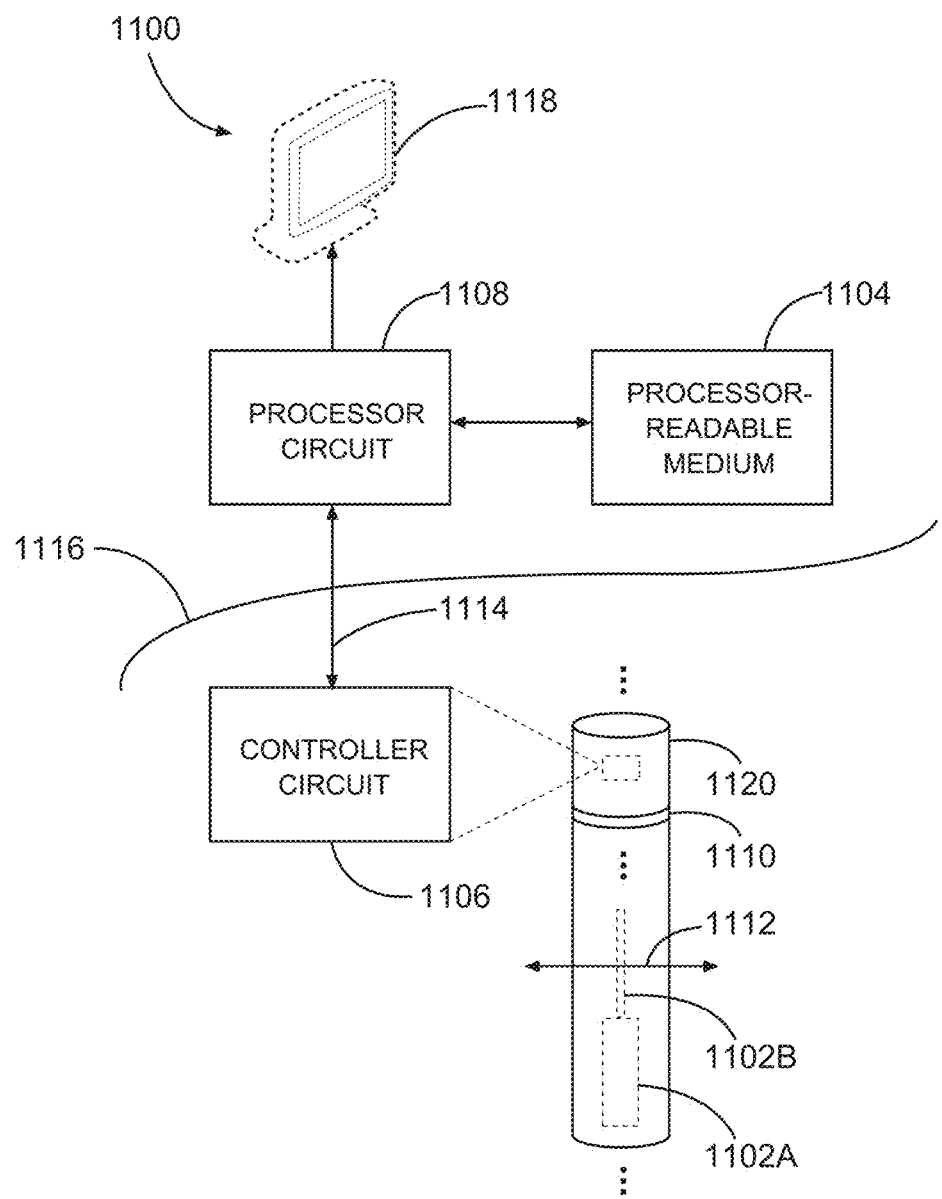
FIG. 11 illustrates generally an example of a system, including a well tool within a borehole communicatively coupled to apparatus on the surface.

FIG. 11 illustrates generally an example of a system 1100, including a well tool 1120 within a borehole communicatively coupled to apparatus on or above the surface 1116. In the illustration of FIG. 11, the well tool 1120 includes a controller circuit 1108. The controller circuit 1106 is configured to electrically drive one or more acoustic transducers, such as a first acoustic transducer 1102A, and a second acoustic transducer 1102B, to acoustically excite a formation surrounding the borehole. According to many examples, the first and second transducers 1102A and 1102B are located within a housing of the well tool 1120, and are acoustically coupled to the formation through the fluid medium surrounding the well tool 1120 using one or more apertures located in the housing of the well tool 1120.

For example, the first and second acoustic transducers 1102A and 1102B include dipole acoustic transducers, such as oriented orthogonally to each other so that an axis of radiation 1112 for the second acoustic transducer 1102B (normal to the plane of the second acoustic transducer 1102B) is rotated 90 degrees with respect to the radiation axis of the first acoustic transducer 1102A. One or more receiving transducers, such as a third acoustic transducer 1110 (e.g., a ring, monopole, or dipole transducer), is located several meters or tens of meters away from the first and second transducers 1102A and 1102B, to receive a portion of the acoustic vibrational energy reflected or refracted back toward the well tool 1120. Generally, the well tool includes an acoustically isolating portion nearby or within the regions located near a receiving transducer, such as at or nearby the third acoustic transducer 1110 (e.g., a receiving transducer).

In an illustrative example of a wireline or tubing-conveyed sonde, the well tool 1120 is communicatively and mechanically coupled to the surface via a cable 1114 or tube. A processor circuit 1108 is located on or above the surface 1116, coupled to a processor-readable medium 1104. The processor circuit 1108 is programmed to receive information indicative of the received acoustic vibrational energy, and may one or more of store such information or process such information to determine one or more formation parameters, such as a slowness parameter, an anisotropy parameter, or a dispersion characteristic, for example. Such parameters may be further processed to provide information indicative of a formation composition or porosity, with respect to one or more of depth or azimuth around the circumference of the tool.

According to various examples, the processor circuit 1108 is programmed to use information indicative of a propagation velocity with respect to frequency, including a simulated dispersion contribution of the acoustic logging tool located in the borehole, to estimate formation parameters or to select or establish an acoustic transmission configuration for acoustic excitation of the formation. In some examples, the processor circuit 1108 is programmed or otherwise configured to perform such simulation, including using a simplified model of the acoustic logging tool as discussed in other examples herein.

While the example of FIG. 11 shows the processor circuit 1108 on or above the surface 1116, the processor circuit 1108 and processor-readable medium 1104 may also or may instead be located within a tool body or sonde downhole, or as a portion of a surface processing system. For example, the controller circuit 1106 generally includes a processor circuit or processor-readable medium. The processor circuit 1108 may be coupled to a communication circuit, such as to provide a communicative coupling between the processor circuit 1108 and the controller circuit 1106. For example, the communication circuit may include one or more of a wireless transmitter, receiver or transceiver, such as using an inductive, radiative (e.g., electromagnetic), or acoustic (e.g., mud pulsing) communication scheme. The communication circuit may use other techniques to transmit or receive information, such as a fiber-optic or other optical communication scheme.

The processor circuit 1108 in FIG. 11 is coupled to a display 1118, to present information indicative of acoustic or formation parameters to a user, or to provide other information regarding status or control of various portions of the system 1100. Generally, the phrase "processor-readable medium" shall be taken to include any tangible non-transitory device which is capable of storing or encoding a sequence of instructions for execution by the machine and that causes the machine to perform any one of the described and/or claimed methodologies. Such a processor-readable medium 1104 includes a machine-readable medium or a computer-readable medium. The term "non-transitory medium" expressly includes all forms of storage devices, including drives (optical, magnetic, etc.) and all forms of memory circuits or devices (e.g., Dynamic Random Access Memory (DRAM), Flash (of all storage designs, including NAND or NOR topologies), Static Random Access Memory (SRAM), Magnetic Random Access Memory (MRAM), phase change memory, etc., as well as all other structures designed to store information of any type for later retrieval. In an example, one or more of the techniques described herein, is implemented at least in part as instructions stored on the processor-readable medium 1104. Such instructions cause the processor circuit 1108 or other portions of the apparatus 1100 to perform various operations, such as including portions or entireties of one or more techniques described herein.

For purposes of illustration, the examples of FIGS. 9 through 11 show a vertically-oriented borehole configuration. However, examples described herein may also be used in other borehole configurations, such as a borehole including a horizontal penetration direction, or an oblique borehole configuration, for example. The examples of FIGS. 9 through 11 also generally illustrate land-based examples. But, examples described herein may be used in offshore environments as well, such as for subsea operations. In particular, offshore or subsea operations may include use of wireline or LWD/MWD apparatus and techniques including aspects of the examples herein.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. In this description, references to "one embodiment" or "an embodiment," or to "one example" or "an example" mean that the feature being referred to is, or may be, included in at least one embodiment or example of the invention. Separate references to "an embodiment" or "one embodiment" or to "one example" or "an example" in this description are not intended to necessarily refer to the same embodiment or example; however, neither are such embodiments mutually exclusive, unless so stated or as will be readily apparent to those of ordinary skill in the art having the benefit of this disclosure.

Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The claimed invention is:

1. A method of modeling an acoustic logging tool, comprising:
    establishing a first cylindrical shell representing an interior tubular portion of an acoustic logging tool, the interior tubular portion including apertures;
    establishing a second cylindrical shell located concentrically outside the first cylindrical shell, the second cylindrical shell representing a acoustically-isolating portion of the acoustic logging tool, including:
        establishing a model density and a model compressional wave propagation velocity of the second cylindrical shell using information about the acoustically-isolating portion of the acoustic logging tool; and
        establishing a model shear wave propagation velocity of the second cylindrical shell as zero or about zero; and
    determining information indicative of a flexural wave propagation velocity with respect to acoustic frequency of the acoustic logging tool using the acoustic logging tool model including the first and second cylindrical shells.

2. The method of claim 1, comprising:
    establishing a borehole model region; and
    establishing a geologic formation model region through which the borehole region extends, wherein determining information indicative of the flexural wave propagation velocity of the acoustic logging tool includes using information about the borehole model region and geologic formation model regions without adjusting model parameters of the first and second cylindrical shells of the acoustic logging tool model in response to geometric or constitutive parameters of the borehole model or geologic formation model regions.

3. The method of claim 2, wherein the determining the information indicative of the flexural wave propagation velocity of acoustic logging tool includes using model parameters of the first and second cylindrical shells of the acoustic logging tool model that do not depend on geometric or constitutive parameters of the borehole model or geologic formation model regions.

4. The method of claim 1, wherein the apertures in the interior tubular portion of the acoustic logging tool couples a fluid located in a central region of the acoustic logging tool to other portions of the tool, and wherein determining the information indicative of a flexural wave propagation velocity with respect to acoustic frequency of the acoustic logging tool includes using the first and second cylindrical shells and a cylinder of modeled fluid located within the first cylindrical shell.

5. The method of claim 1, wherein the acoustically-isolating portion of the acoustic logging tool comprises a mass block, and wherein the model density and the model compressional wave propagation velocity of the second cylindrical shell are specified to be about equal to a density and a compressional wave propagation velocity of a material of the mass block.

6. The method of claim 1, wherein an inside diameter of the first cylindrical shell is specified to be about equal to the inside diameter of the interior tubular portion of the acoustic logging tool, wherein an outside diameter of the first cylindrical shell is specified to be about equal to the outside diameter of the interior tubular portion of the acoustic logging tool.

7. The method of claim 1, wherein the first cylindrical shell is homogeneous including a model elastic modulus and a model Poisson's ratio.

8. The method of claim 7, comprising determining the model elastic modulus and the model Poisson's ratio for use with the first cylindrical shell including:
establishing a model of the interior tubular portion of the acoustic logging tool including the apertures;
determining information indicative of a flexural wave propagation velocity with respect to frequency of the model of the interior tubular portion including the apertures in a water medium; and
identifying the model elastic modulus and the model Poisson's ratio for use with the first cylindrical shell that provide a specified fit between flexural mode propagation velocities of the model of the interior tubular portion and the first cylindrical shell across a specified range of frequencies.

9. The method of claim 1, wherein the first cylindrical shell is homogeneous and lacks apertures along a wall of the cylindrical shell.

10. The method of claim 9, wherein the first cylindrical shell includes a model density, and wherein the model density is determined by dividing a mass of the interior tubular portion including apertures by a modeled volume of the homogenous first cylindrical shell lacking apertures.

11. The method of claim 1, wherein the determined information indicative of the flexural wave propagation velocity with respect to acoustic frequency of the acoustic logging tool includes acoustic dispersion information comprising information about flexural wave slowness with respect to acoustic frequency.

12. The method of claim 11, wherein the acoustic dispersion information is provided to a geologic formation inversion routine, the formation inversion routine to extract information indicative of one or more of a geologic formation porosity or a geologic formation composition at least in part using the acoustic dispersion information.

13. The method of claim 11, wherein the acoustic dispersion information is used to determine an excitation waveform to be used by the acoustic logging tool when the acoustic logging tool is located in a borehole.

14. A processor-readable medium including instructions that, when performed by a processor circuit, cause the processor circuit to perform operations comprising:
establishing a first cylindrical shell representing an interior tubular portion of an acoustic logging tool, the interior tubular portion including apertures;
establishing a second cylindrical shell located concentrically outside the first cylindrical shell, the second cylindrical shell representing a acoustically-isolating portion of the acoustic logging tool, including:
establishing a model density and a model compressional wave propagation velocity of the second cylindrical shell using information about the acoustically-isolating portion of the acoustic logging tool; and
establishing a model shear wave propagation velocity of the second cylindrical shell as zero or about zero; and
determining information indicative of a flexural wave propagation velocity with respect to acoustic frequency of the acoustic logging tool using the acoustic logging tool model including the first and second cylindrical shells.

15. A system, comprising:
a memory circuit;
a processor circuit coupled to the memory circuit, the processor circuit programmed using instructions stored in the memory circuit to:
receive information indicative of a first cylindrical shell representing a portion of an acoustic logging tool;
receive information indicative of a second cylindrical shell concentrically surrounding the first cylindrical shell, the second cylindrical shell representing a second portion of the acoustic logging tool, the second cylindrical shell comprising a fluid metal model including a non-zero density, a non-zero compressional wave propagation velocity, and a shear wave propagation velocity of zero or about zero;
determine information indicative of an acoustic dispersion comprising a slowness of a wave propagating along the acoustic logging tool determined with respect to acoustic frequency using an acoustic logging tool model including the first and second cylindrical shells; and
store the acoustic dispersion using the memory circuit.

16. The system of claim 15, wherein the processor circuit is programmed to:
receive information indicative of a borehole model region including geometric and constitutive parameters;
receive information indicative of a geologic formation model region through which the borehole model region extends, including receiving geometric and constitutive parameters of the geologic formation model; and
determine the information indicative of the acoustic dispersion using information about the borehole model region and geologic formation model regions but without requiring adjustment of model parameters of the first and second cylindrical shells of the acoustic logging tool model in response to geometric or constitutive parameters of the borehole model or geologic formation model regions.

17. The system of claim 15, wherein the processor circuit is programmed to determine the model elastic modulus and the model Poisson's ratio for use with the first cylindrical shell including:
  establishing a model of an interior tubular portion of the acoustic logging tool including apertures; and
  determining information indicative of an acoustic dispersion of the model of interior tubular portion including the apertures in a water medium; and
  identifying the model elastic modulus and the model Poisson's ratio for use with the first cylindrical shell that provide a specified fit between the acoustic dispersions of the model of the interior tubular portion and the first cylindrical shell across a specified range of frequencies.

18. The system of claim 15, wherein the first cylindrical shell corresponds to an interior tubular portion of an acoustic logging tool, the interior tubular portion of the acoustic logging tool including apertures coupling a fluid located in a central region of the acoustic logging tool to other portions of the tool, and wherein the processor circuit is programmed to determine the information indicative of the acoustic dispersion using the first and second cylindrical shells and a cylinder of modeled fluid located within the first cylindrical shell.

19. The system of claim 15, wherein the processor circuit is programmed to provide the acoustic dispersion information to a geologic formation inversion routine, the formation inversion routine to extract information indicative of one or more of a geologic formation porosity or a geologic formation composition.

20. The system of claim 15, wherein the processor circuit is programmed to use the acoustic dispersion information to determine an excitation waveform to be used by the acoustic logging tool when the acoustic logging tool is located in a borehole.

* * * * *